(12) United States Patent
Lausenhammer et al.

(10) Patent No.: US 6,315,543 B1
(45) Date of Patent: Nov. 13, 2001

(54) DETECTION AND REMOVAL SYSTEM FOR REDUCING CYCLE TIME OF AN INJECTION MOLDING APPARATUS

(75) Inventors: Manfred Lausenhammer, Konz Niedermenning; Arnold Mai, Irel; Frank Oster, Landscheid; Stephan Klang, Saarbruecken, all of (DE); Sven Mertes, Luxembourg (BE); Witold Neter, Newnan, GA (US); Hai Luong, Scarborough; Tiemo Brand, North York, both of (CA)

(73) Assignee: Husky Injection Molding Systems, Ltd. (CA)

( * ) Notice: Subject to any disclaimer, the term of this patent is extended or adjusted under 35 U.S.C. 154(b) by 0 days.

(21) Appl. No.: 09/306,459

(22) Filed: May 7, 1999

Related U.S. Application Data
(60) Provisional application No. 60/085,730, filed on May 15, 1998.

(51) Int. Cl.⁷ ................................................ B29C 49/70
(52) U.S. Cl. .................... 425/139; 264/334; 264/336; 425/556; 425/444; 425/537; 425/169
(58) Field of Search ...................... 425/139, 556, 425/534, 533, 526, 170, 169, 537, 444, 540; 264/336, 334

(56) References Cited

U.S. PATENT DOCUMENTS

| | | | |
|---|---|---|---|
| 3,700,375 | * 10/1972 | Rees | 425/444 |
| 4,187,267 | 2/1980 | Fisher | 264/40.1 |
| 4,603,329 | 7/1986 | Bangerter | 340/679 |
| 4,729,732 | 3/1988 | Schad et al. | 425/526 |
| 4,777,475 | 10/1988 | Mita et al. | 340/540 |
| 5,250,239 | 10/1993 | Herbst | 264/40.5 |
| 5,447,426 | 9/1995 | Gessner et al. | 425/436 R |
| 5,591,385 | * 1/1997 | Arai et al. | 425/552 |
| 5,629,031 | * 5/1997 | Ishikawa et al. | 425/556 |

* cited by examiner

Primary Examiner—Nam Nguyen
Assistant Examiner—Thu Khanh T. Nguyen
(74) Attorney, Agent, or Firm—Katten Muchin Zavis

(57) ABSTRACT

An injection molding machine includes various devices for reducing injection cycle time. A molded article detection apparatus and method are disclosed. The detection system and method determines if an article, or a portion thereof, remains on a machine core pin after the article ejection cycle has occurred, and, if so, communicates this condition to both the machine controller and the take-out controller. This prevents the machine from starting a new cycle and damaging the injection mold. Also, by communicating the extraction status to both the take-out controller and machine controller, if no articles or portions remain, injection cycle time is reduced. Additionally, a variable vacuum pressure apparatus and method are described. The apparatus and method allows early removal of molded articles from the molds into a take-out plate while the parts are still warm.

44 Claims, 6 Drawing Sheets

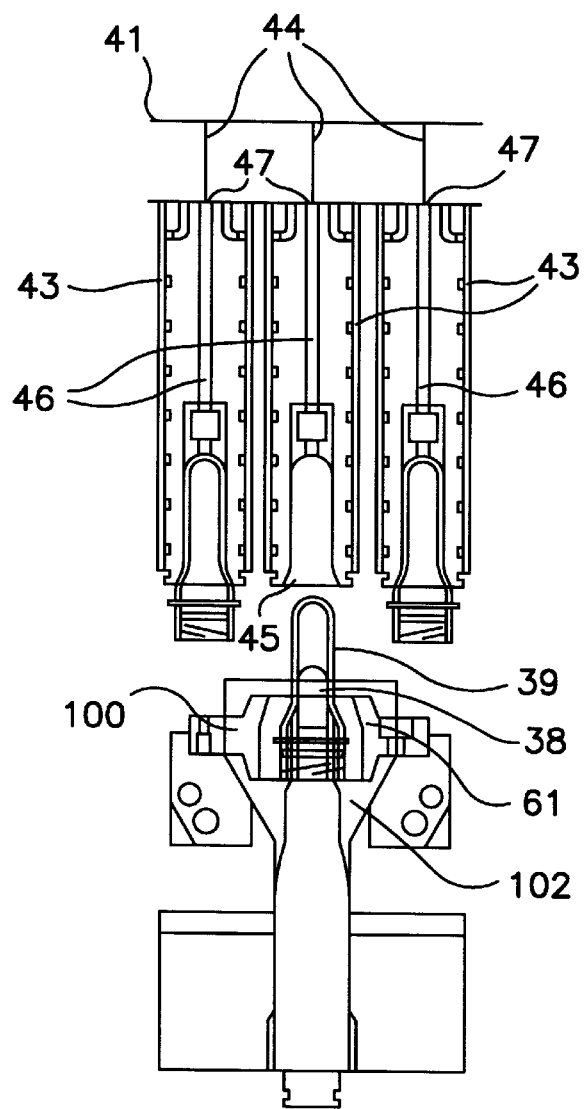
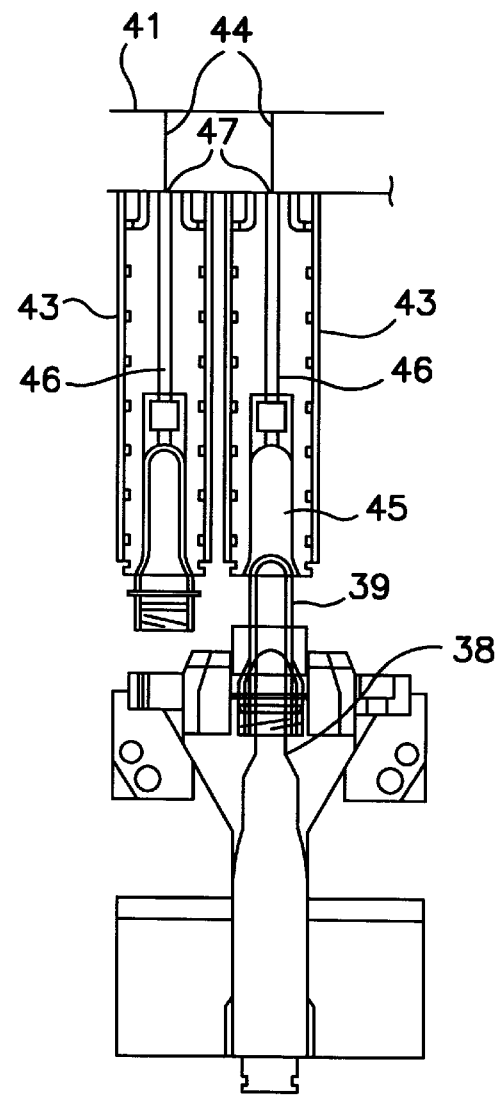
FIG. 4c
FIG. 4d

DETECTION AND REMOVAL SYSTEM FOR REDUCING CYCLE TIME OF AN INJECTION MOLDING APPARATUS

This application claims the benefit of U.S. Provisional Application No. 60/085,730, filed May 15, 1998.

BACKGROUND OF THE INVENTION

1. Field of the Invention

The present invention relates to a system and method for reducing the cycle time of an injection molding machine. More particularly, the invention relates to an improved device and method for detecting the presence of an article on a mold of an injection molding machine, and controlling the operation of the device on the basis of this detection. The invention further relates to a device and method for removing molded articles from a mold of an injection molding machine before the articles are fully cooled. Both of these devices and methods, when used individually or together in an injection molding machine, reduce the machine's injection cycle time.

2. Description of Related Art

Containers are commonly made by blow molding a parison or preform that is made from polyethylene terephthalate (PET) material. The PET preheat and blow parisons are commonly manufactured by injection molding equipment. Containers may be injection molded in high-volume, multi-cavity molds.

It is important to reduce the overall cycle time for several reasons: (1) greater efficiency and cost-competitiveness; (2) reduced resin degradation due to prolonged residence time in the mold (specifically, acetaldehyde in PET parts); and (3) improved visual part quality (crystallization, seen as cloudy regions in the molded parts, may occur if cycle times are excessive).

Problems may also occur if articles or portions of articles are left on the mold core pins after the ejection cycle. Portions of articles may remain on the core pins due to (1) failure of the ejection system, (2) breakage of the parison during stripping from the cores, or (3) a "short shot" due to insufficient plasticized material being supplied to the mold cavities. If any molded portions remain on the core pins when the injection mold halves close, the injection mold may be damaged or the next successive part may be defective. To prevent this from happening, a conventional injection molding machine is set-up such that the device (e.g., a take-out plate) used to remove the molded parts from the core pins does not leave the molding area until it receives a signal from the injection molding machine controller that all the molded articles (or portions) have been removed from the core. This conservative approach lengthens the total molding injection cycle time. It also does not confirm that all of the molded articles are on the take-out plate and off the mold core pins. Thus, it would be desirable to reduce the injection cycle time by removing this conservatism from the injection molding process.

To further reduce cycle time, it would be desirable to remove the molded articles from the mold core before they are fully cooled. However, in this state, the parts are soft and malleable and susceptible to surface damage and mechanical deformation. Thus, there is also a need to develop a way to extract molded parts while they are still warm to reduce total cycle time.

SUMMARY OF THE PRESENT INVENTION

It is therefore a principal object of the present invention to provide apparatuses and methods for reducing the total injection cycle time needed to mold and safely eject parisons in a multi-cavity mold. The invention is, however, not restricted to parisons, and may apply to any molded article that shrinks onto the core halves of a mold after injection and cooling.

In one aspect of the present invention, an apparatus for controlling a machine controller and a take-out controller of an injection molding machine includes a radiation source, a radiation detector, a machine controller, and a take-out controller. The radiation source projects radiation to a mold plate. The radiation detector receives the projected radiation from the mold plate. The machine controller receives a signal from the radiation detector, determines whether any molded parts or portions of molded parts remain at a predetermined position on the mold plate, and provides a command signal to stop injection operations when it is determined that molded parts or portions of molded parts remain at the predetermined position. The take-out controller substantially simultaneously receives a signal from the radiation detector, determines whether any molded parts or portions of molded parts remain at a predetermined position on the mold plate, and provides a command signal to stop take-out operations when it is determined that molded parts or portions of molded parts remain at the predetermined position.

In another aspect of the present invention, an injection molding machine includes a platen, a mold attached to the platen, a radiation emitting element, a radiation receiving element, a take-out controller and a machine controller. The mold includes at least one core pin extending perpendicular to a surface of the mold and has a longitudinal axis. The radiation emitting element is adjacent the mold and positioned to emit a radiation beam proximate the core pin and perpendicular to the longitudinal axis of the core pin. The radiation receiving element is adjacent the mold and positioned to receive the radiation beam emitted from the radiation emitting element. The take-out controller is connected to the radiation receiving element and receives signals from the radiation receiving element. The machine controller, which is connected to the radiation emitting and receiving elements, provides power and control signals to the elements, and receives signals from the radiation receiving element.

In a further aspect of the invention, an apparatus for detecting the presence of an article on a mold core pin of an injection molding machine includes at least one radiation emitting element, at least one radiation receiving, a take-out controller, and a machine controller. The radiation emitting element is adjacent the mold and positioned to emit a radiation beam proximate the core pin and perpendicular to the longitudinal axis of the core pin. The radiation receiving element is spaced apart from the radiation emitting element and positioned to receive the emitted radiation. The take-out controller is connected to the radiation receiving element and provides a signal to stop a take-out device when the radiation receiving element indicates that the article has not been removed from a predetermined portion of the mold core pin. The machine controller, which is connected to the radiation emitting and receiving elements, provides power and control signals to the elements, and provides a signal to stop injection operations when the radiation receiving element indicates that the article has not been removed from the predetermined position.

In yet another aspect of the present invention, a method of detecting the presence of an article on a mold core pin of an injection molding machine includes positioning a radiation transmitting element to transmit radiation proximate the mold core pin and perpendicular to a longitudinal axis thereof, positioning a radiation receiving element at a position spaced apart from the radiation transmitting element, and determining that an article is still present on the mold core pin when the transmitted radiation is not received by the radiation receiving element. A signal is transmitted substantially simultaneously to both a machine controller and a take-out controller when it is determined that an article is present on the mold core pin.

In still another aspect of the present invention, an apparatus for controlling a vacuum device which removes molded parts from a a mold plate of an injection molding machine includes a controller which controls the vacuum device so as to apply a higher vacuum pressure to the molded parts to begin their removal from the mold plate, and to apply a lower vacuum pressure to the molded parts after they begin moving from the mold plate. This is because partially cooled parts are soft and can be deformed if exposed to a sustained high vacuum pressure.

In still a further aspect of the present invention, an apparatus for removing a molded article from a mold of an injection molding machine includes a plate, at least one vacuum passage, at least one hollow receiving member, a vacuum pressure source, and a vacuum relief valve. The plate has at least first and second surfaces, and at least one vacuum passage extending between the first and second surfaces, wherein each passage includes a port on the first and second surfaces. The at least one hollow receiving member is attached to the second surface of the plate, and each hollow member has two openings wherein one opening surrounds a vacuum passage port. The vacuum pressure source is in fluid communication with each port on the first surface of plate, and the vacuum relief valve is in fluid communication with each port on the first surface of the plate, and varies the vacuum pressure applied to the molded part.

In an additional aspect of the present invention, an apparatus for removing an article from the mold of an injection molding machine includes a plate, a hollow tube, vacuum pressure generating means, vacuum pressure sensing means, and a relief valve. The hollow tube is attached to a first surface of the plate, and has a hollow central portion for receiving the article from the mold. The vacuum generating means generates a vacuum within the hollow tube, such that the vacuum pressure develops a force urging the article from the mold toward the hollow central portion. The vacuum pressure sensing means senses the magnitude of the vacuum pressure within the hollow tube and generates a control signal if the vacuum pressure reaches a first predetermined magnitude. The relief valve means receives the control signal from the sensing means and reduces the magnitude of the vacuum pressure to a second predetermined magnitude.

In yet an additional aspect of the present invention, a method of removing a molded article from a mold of an injection molding machine includes connecting a vacuum pressure source to a receiving means that receives the molded article, wherein the vacuum pressure source generates a vacuum pressure magnitude within the receiving means; moving the receiving means adjacent the molded article, such that the vacuum pressure within said receiving means draws said molded article into said receiving means; sensing the vacuum pressure magnitude within the receiving means; and reducing the vacuum pressure magnitude within the receiving means to a predetermined magnitude.

In still an additional aspect of the present invention, an injection molding machine includes a platen, a mold attached to the platen, clamping means for applying a clamping load to the mold, and injection means for injecting molten material into the mold. Radiation emitting means, positioned adjacent the mold, emits radiation proximate the mold. Radiation receiving means, positioned adjacent the mold, receives the radiation emitted from the radiation emitting means. Machine controller means controls the operation of the clamping means and the injection means, provides power and control signals to the radiation emitting and receiving means, and receives signals from the radiation receiving means. The machine also includes a movable take-out plate having a first surface adjacent the surface of the mold, and a hollow tube attached to the first surface of the take-out plate. The hollow tube includes a hollow central portion for receiving an article from the mold. Means for moving the take-out plate. Take-out controller means controls the take-out plate moving means, and receives signals from the radiation receiving means. Means for generating a vacuum pressure within the hollow tube, wherein the vacuum pressure develops a force urging the article from the mold toward the hollow central portion. Vacuum pressure sensing means senses a magnitude of the vacuum pressure within the hollow tube and generates a control signal if the vacuum pressure reaches a first predetermined magnitude. Relief valve means receives the control signal from the sensing means and reduces the magnitude of the vacuum pressure to a second predetermined magnitude.

BRIEF DESCRIPTION OF THE DRAWINGS

FIGS. 4(a)–4(d) illustrate various removal states of an injection molded article by a takeout plate according to the present invention.

DETAILED DESCRIPTION OF THE PREFERRED EMBODIMENTS

Figure 1:
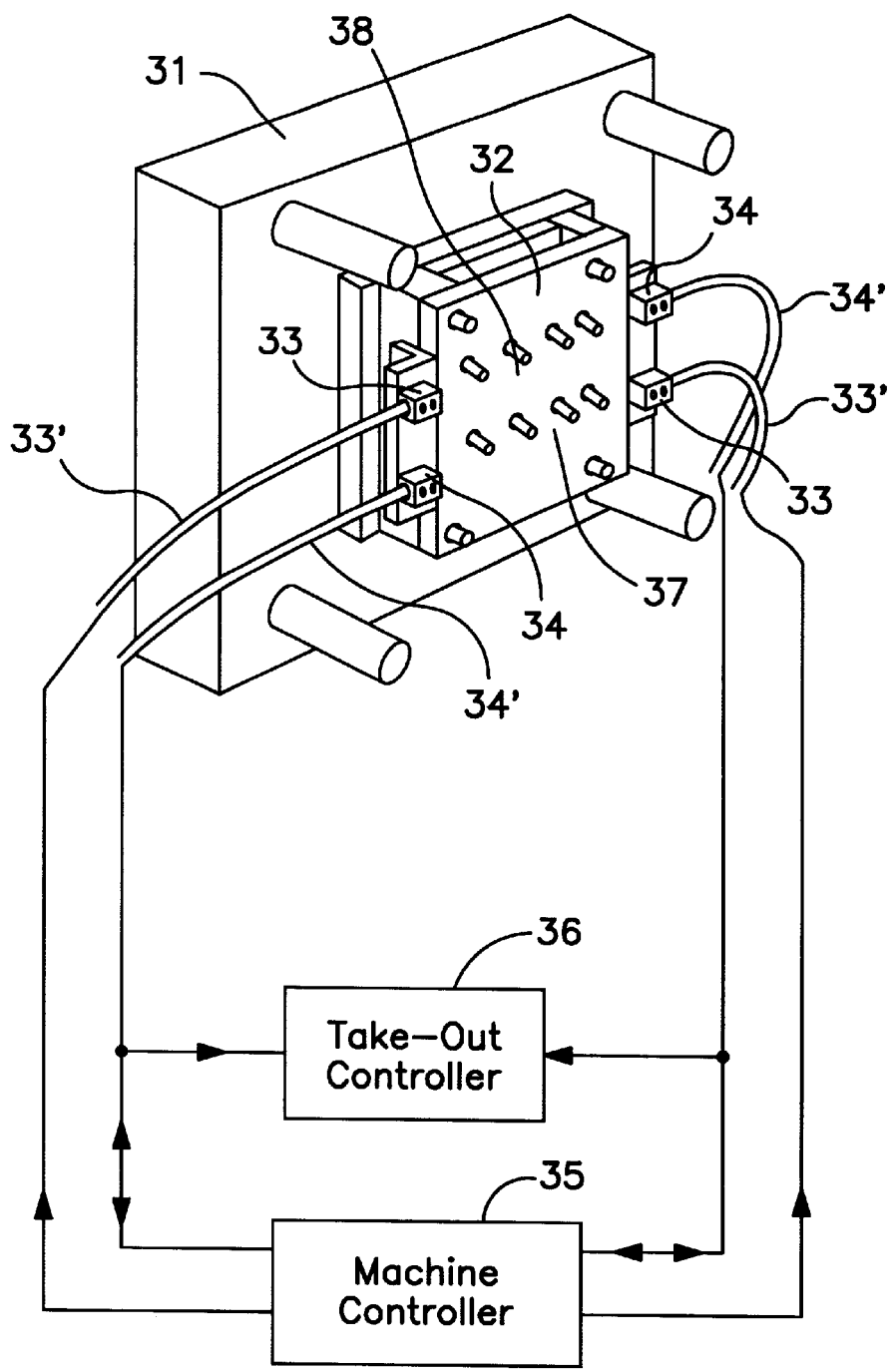
FIG. 1 is a perspective view of an article detection device according to a first embodiment of the present invention.
Figure 2:
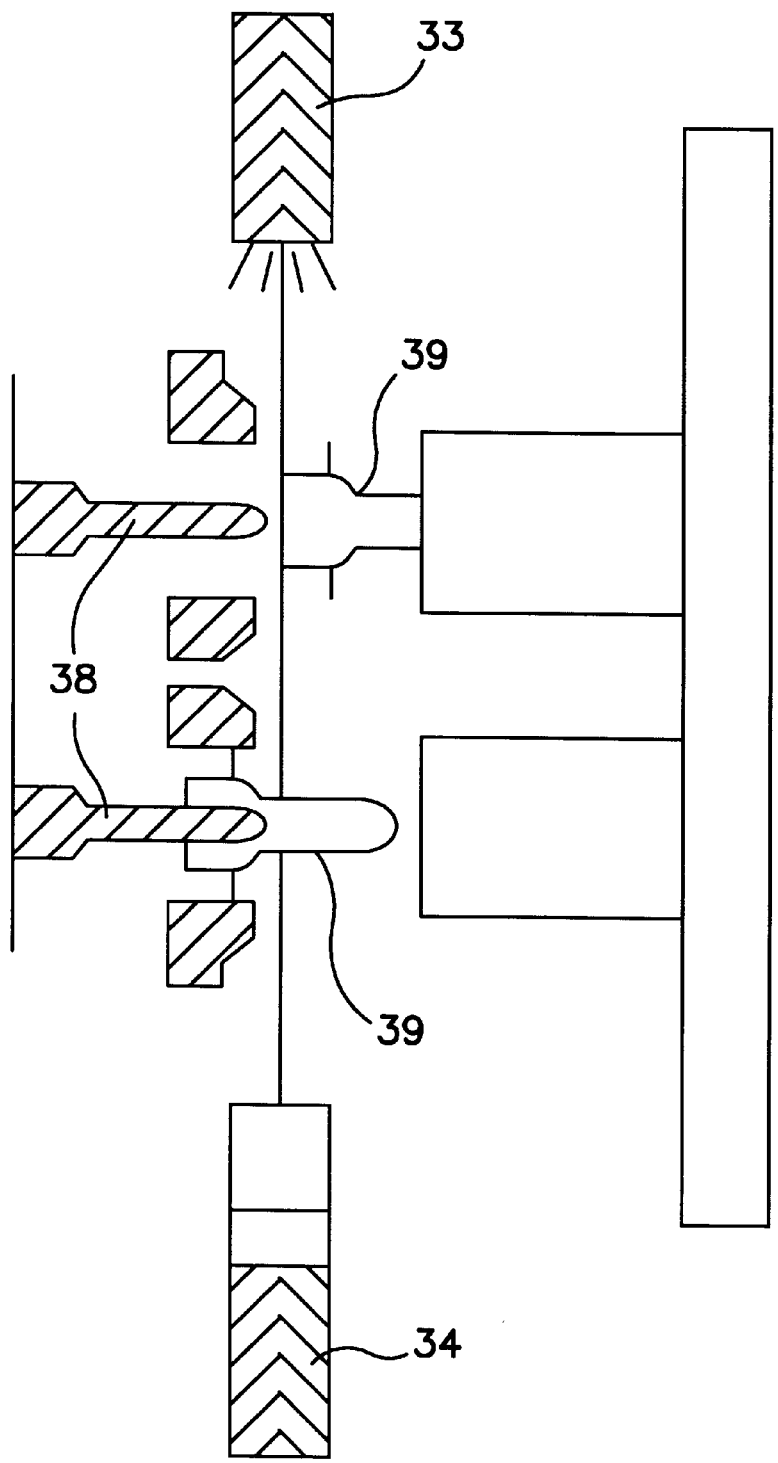
FIG. 2 is a section view of showing two possible core pin conditions following completion of an injection mold cycle.
Figure 3:
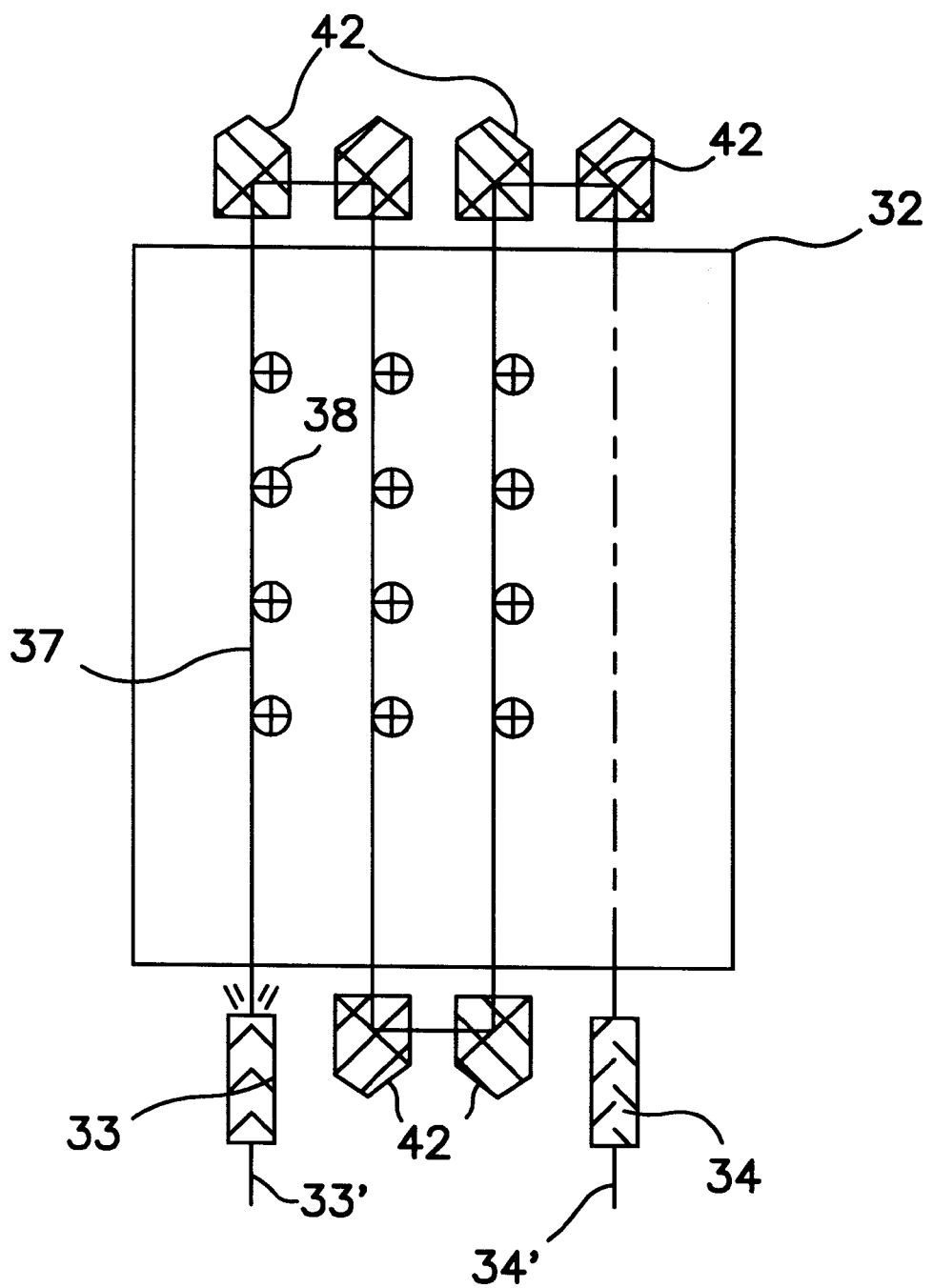
FIG. 3 is a plan view of an article detection device according to a second embodiment of the present invention.

FIGS. 1, 2, and 3 depict systems for detecting the presence of an article, or portion of an article, on the core pin of an injection mold after an ejection step of the injection mold cycle has occurred. The depicted systems are capable of scanning a plurality of aligned core pins and detecting the presence of articles that fail to eject. Referring now to FIGS. 1 and 2, a detailed description of a first embodiment of the present invention will be provided.

In the first embodiment, the detection system includes a plurality of radiation emitting elements 33 and radiation receiving elements 34. These elements 33, 34 are attached to a mold 32 that is mounted on a platen 31, and are arranged such that each receiving element 34 is directly opposite a transmitting element 33. The radiation emitters and detectors 33, 34 could be any device known to the ordinarily skilled artisan. For example, emitting elements 33 could be, but are not limited to, infrared light sources, white light sources, or light emitting diodes (LEDs). Examples of receiving elements 34 include, but are not limited to, photoresistors, photodiodes, phototransistors, or photovoltaic cells. These devices can also include appropriate lenses to reduce ambient light sensitivity. In the preferred embodiment, the radiation emitting and receiving elements are laser emitters and detectors.

The radiation emitting elements 33 are electrically connected to a machine controller 35. The radiation receiving elements 34 are electrically connected to both machine controller 35 and a take-out controller 36. Connections 33' connect emitting elements 33 to machine controller 35, and connections 34' connect receiving elements 34 to machine controller 35 and take-out controller 36. Connections 33' and 34' could be any connecting device known to the ordinarily skilled artisan, such as electrical cords, wiring, or cables, or fiber optic cables. However, in the preferred embodiment these connections are electrical cords. Machine controller 35 provides power and control signals, via connections 33', 34', to emitting and receiving elements 33, 34. Receiving elements 34 provide signals to both machine controller 35 and take-out controller 36, as will be described further below.

Radiation emitting and receiving elements 33, 34 are arranged such that the emitted radiation 37 scans across a series of core pins 38. Thus, if the radiation 37 emitted from an emitting element 33 is not received by its concomitant receiving element 34, this indicates that an article 39, or portion of an article, remains on a core pin 38. This situation is depicted in FIG. 2. When this situation occurs, both machine controller 35 and take-out controller 36 are alerted virtually simultaneously via connections 34'. As a result, machine controller 36 will issue a command to stop the next clamping and injection operation, and take-out controller 36 will prevent movement of the take-out plate 41. If, however, the radiation 37 emitted from the emitting elements 33 is received by the concomitant receiving elements 34, then, once again, both controllers 35, 36 are simultaneously alerted to this situation. Machine controller 35 will not prohibit the next clamping and injection operations, and take-out controller 36 will command take-out plate 41 to move out of the mold area.

In a second embodiment of the present invention, as depicted in FIG. 3, a single emitting element 33 and single receiving element 34 can be used for detection. This is made possible by the use of radiation redirecting devices 42. In this embodiment, an emitting element 33 is placed adjacent a series of core pins 38 of a mold 32. The emitted radiation beam 37 scans across the plurality of core pins 38, and a device 42 is placed directly opposite emitting element 33 to receive the emitted radiation beam 37. Radiation beam 37, if not blocked, is then redirected toward an adjacent device 42, which in turn redirects beam 37 toward another device 42 on the opposite side of mold 32 along another series of core pins 38. This redirection of beam 37 is continued for as many series of core pins 38 as are present on mold 32. For the last series, beam 37 is received by receiving element 34. Devices 42 may be any device known in the art for redirecting radiation. For example, devices 42 could be, but are not limited to, mirror-type reflectors, refracting lenses, or optical fibers, but in the preferred embodiment are prisms.

Operation of the second embodiment is similar to the first. Thus, if receiving element 34 does not receive beam 37, then machine controller 35 and take-out controller 36 are simultaneously alerted. Controller 35 then issues a command to stop the next clamping and injection operation, and controller 36 prevents movement of the take-out plate 41. If, however, the radiation beam 37 emitted from the emitting element 33 is received by receiving element 34, then the next clamping and injection operations are not prohibited by machine controller 35, and take-out controller 36 commands take-out plate 41 to leave the mold area.

Because machine controller 35 and take-out controller 36 are both directly connected to receiving element(s) 34, both controllers are simultaneously alerted to whether an article 39, or portion thereof, remains on a core pin 38. Therefore, if no article 39, or portion thereof, remains on a core pin 38, then take-out controller 36 need not wait for a command from machine controller 35 to initiate movement of take-out plate 41. As a result, significant injection molding cycle time savings can be realized. For example, for a 4×12 (48 cavity) mold, a cycle time saving between 100 and 150 milliseconds can be realized. Similar cycle time savings can be realized for other mold sizes.

Injection molding cycle time can also be improved by reducing the time it takes to transfer an article 39 from a core pin 38 to a take-out plate 41. Accomplishing this time reduction using a high pressure vacuum, while avoiding the problems of the prior art, will now be discussed with reference to FIGS. 4(a)–4(e) and FIG. 5.

FIGS. 4(a)–4(d) depict various removal states of an article 39 by a take-out plate 41. Each of these Figures shows a portion of a take-out plate 41, which includes passages 44 extending therethrough. Attached to take-out plate 41, and surrounding each passage 44, are tubes 43. Tubes 43 include a cavity 45 for receiving an article 39, and passages 46 extending between the cavity 45 and a port 47 in an end of the tube 43. Each port 47 is collocated with a passage 44 of take-out plate 41. A vacuum pressure is communicated to each passage 44, and thus to each cavity 45, to urge the article 39 toward the tube 43. This general operation will now be described.

Figure 4A:
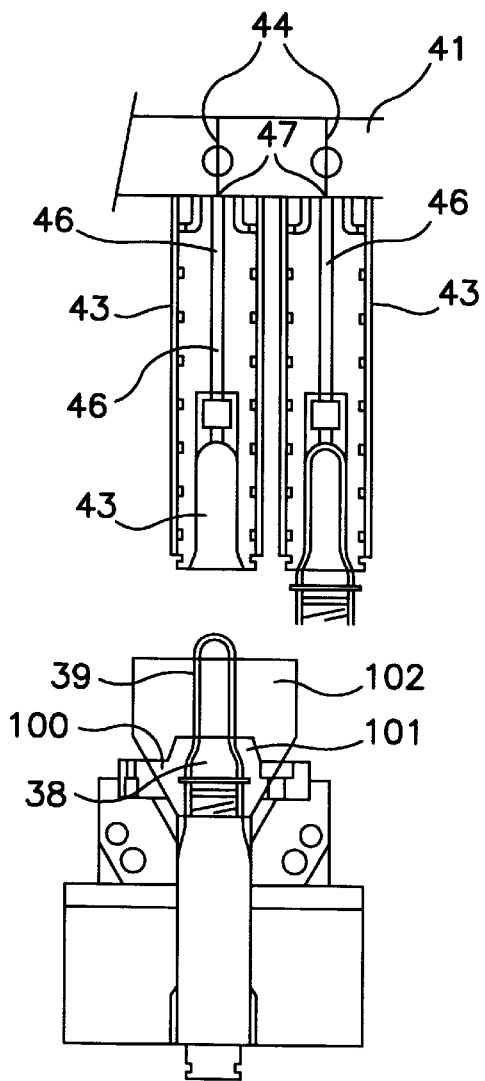
Figure 4B:
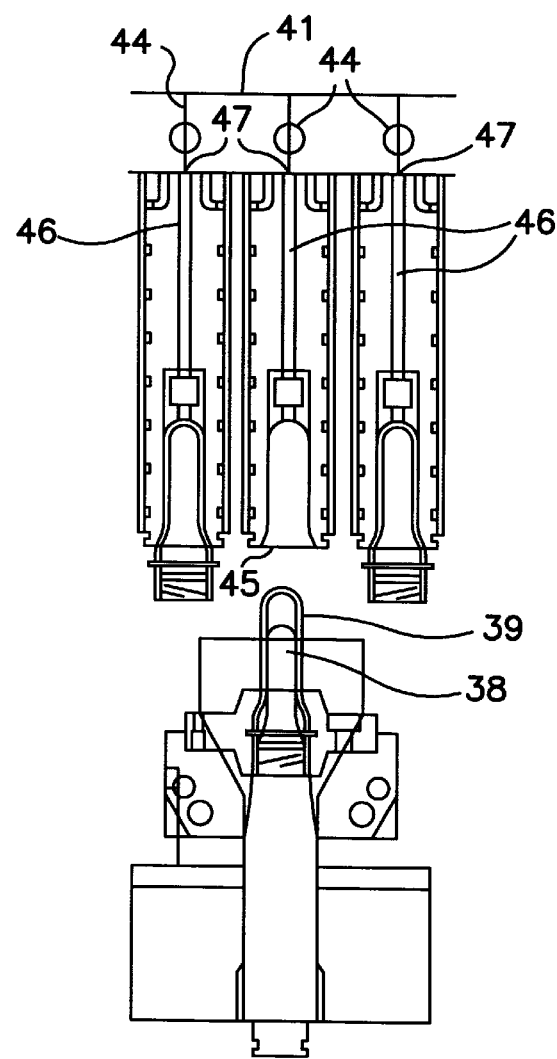
Figure 5:
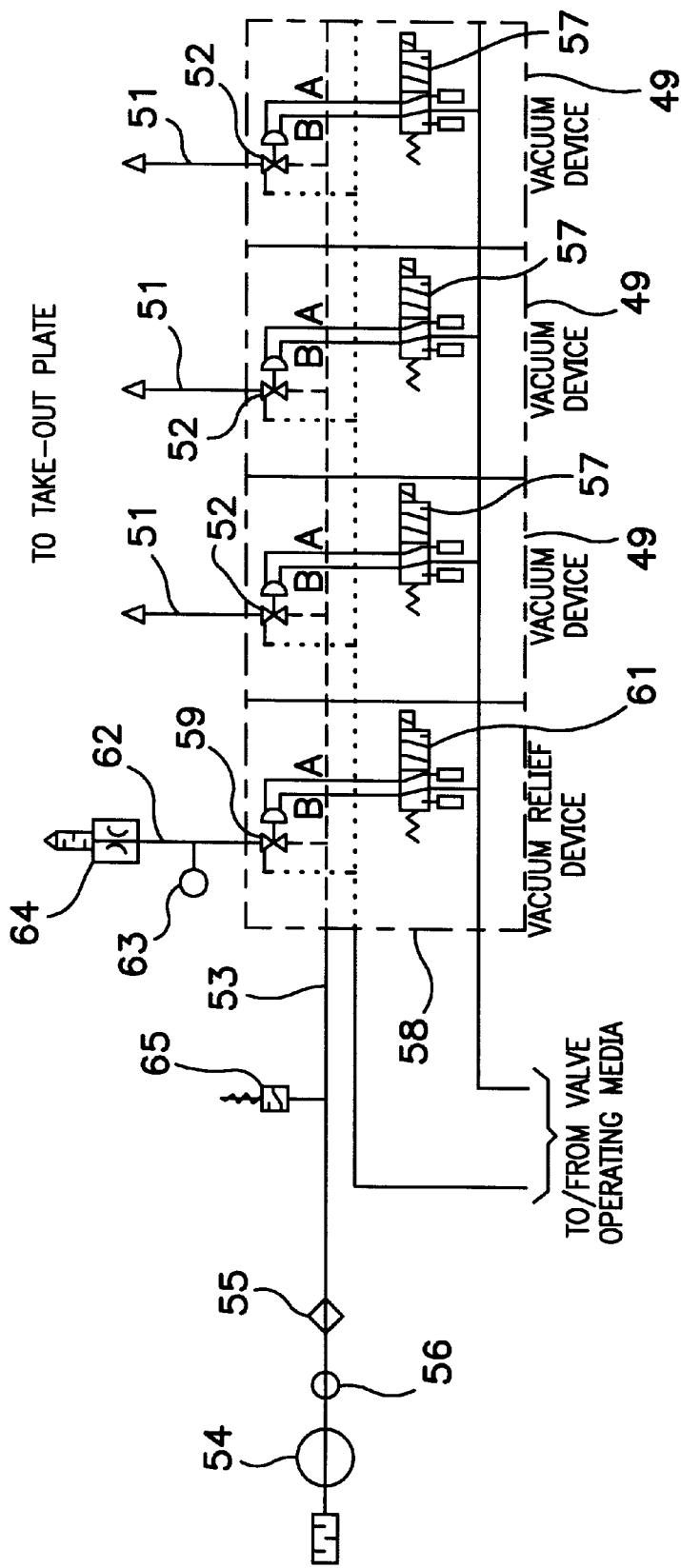
FIG. 5 is a schematic showing a vacuum pressure removal device according to the present invention according to the present invention.

FIG. 4(a) depicts article 39 positioned on core pin 38 following the molding process, and just prior to the removal process. Vacuum pressure is communicated to cavity 45, via passages 44 and 46, but article 39 has not been fully released. FIG. 4(b) depicts the start of release of article 39 from core pin 38 by movement of neck splits 100 and 101. FIGS. 4(c) and 4(d) depict further disengagement of article 39 from core pin 38, and FIG. 4(e) depicts full receipt of article 39 into cavity 45. Referring now to FIG. 5, the improved system for effecting article extraction from the core pins according to the present invention will now be described in detail.

The vacuum pressure part removal system is in fluid communication with take-out plate 41 via passages 51. Passages 51 communicate with concomitant passages 44 on take-out plate 41 (see FIGS. 4(a)–4(d)). Connected to each passage 51 is a vacuum device 49. Each vacuum device includes a valve 52, which could be any type known to an ordinarily skilled artisan that allows automatic, remote control. For example, valve 52 could be either a globe valve or a gate valve, and could be air-operated, solenoid-operated, or hydraulically operated. In the preferred embodiment, however, valve 52 is an air-operated globe valve. In fluid communication with each valve 52 is vacuum passage 53. Vacuum passage 53 provides fluid communication between a vacuum source 54 and each valve 52. Vacuum source 54 may be any device known in the art for developing a vacuum pressure, but in the preferred embodiment is a vacuum pump. Vacuum passage 53 can also include a filter 55 and a vacuum gauge 56, both of which may be any type known in the art. As previously noted, in the preferred embodiment valves 52 are air-operated. Thus, in the preferred embodiment, each vacuum device 49 includes a solenoid-operated positioning valve 57 connected to each operator of valves 52. Each positioning valve 57 directs the flow of the operating media (e.g., air) to and from each valve 52 operator to position each valve 52 to the open or close position. Although FIG. 5 shows only three passages 51 and concomitant vacuum devices 49, this is only for exemplary purposes and any number may be used to meet the required size of the take-out plate 41.

Also in fluid communication with each valve 52, via vacuum passage 53, is a vacuum relief device 58. Vacuum relief device 58 includes valves 59 and 61, which may be any type known in the art, as previously noted for valves 52 and 57, but in the preferred embodiment are the same design as valves 52 and 57, respectively. Connected to valve 59 is vacuum relief passage 62, which can include a vacuum gauge 63 and an adjustable flow control device 64. Vacuum gauge 63 and flow control device 64 can be any device known in the art for carrying out each individual function. Vacuum relief device 58 is controlled based upon the vacuum pressure sensed in vacuum passage 53. When the magnitude of the vacuum pressure in vacuum passage 53 reaches a predetermined setpoint, valve 59 is opened thus reducing the vacuum pressure magnitude within each cavity 45 of each tube 43 connected to take-out plate 41. Vacuum relief device 58 can be controlled by any device known in the art, but in the preferred embodiment is controlled by a variable setpoint vacuum switch 65.

With the removal system just described, articles 39 can be extracted from core pins 38 early in the injection molding cycle, while the articles 39 are still warm. This is because as the articles 39 begin to seal within cavities 45 of tubes 43, the magnitude of the vacuum in passage 53 is lowered by vacuum relief device 58. Initially, a very high vacuum pressure is used to draw molded articles 39 toward cavities 45 while the articles 39 are still warm. As articles 39 begin entering cavities 45, the magnitude of the vacuum begins increasing in vacuum passage 53. When this magnitude reaches a predetermined, variable setpoint of more than 40 inches of water, positioning valve 61 is positioned to direct operating air to open valve 59. Vacuum pressure in passage 53 is then reduced or maintained via flow control device 64. Flow control device 64 is set to maintain the vacuum pressure magnitude to a level just above that necessary to hold articles 39 within cavities 45.

If not reduced, the vacuum pressure would reach 130 inches of water and deform the preforms. (There is no time saving by using vacuum pressure relief, only protection of part quality.) If articles 39 are removed while still warm and a variable vacuum pressure is not used, articles 39 become elongated and contain surface marks. Thus, the variable vacuum system of the present invention reduces the overall injection molding cycle time while improving article 39 quality.

While preferred embodiments of the present invention have been illustrated in detail, it is apparent that modifications and adaptations of the preferred embodiments will occur to those skilled in the art. However, it will be expressly understood that such modifications and adaptations are within the spirit and scope of the present invention as set forth in the following claims.

We claim:

1. Apparatus for controlling a take-out plate which removes molded parts from a mold plate in an injection molding machine, comprising:
   a radiation source for projecting radiation to said mold plate;
   a radiation detector which receives said projected radiation from said mold plate;
   a machine controller connected to said radiation source and said radiation detector, said machine controller being configured to provide power and control signals to said radiation source and detector, said machine controller being configured to receive a sensing signal from said radiation detector; and
   a take-out controller which (i) receives the sensing signal from said radiation detectors, (ii) determines whether any molded parts or portions of molded parts remain at a predetermined position on said mold plate, and (iii) provides a command signal to cause said take-out plate to move when it is determined that no molded parts or portions of molded parts remain at the predetermined position on said mold plate.

2. The apparatus of claim 1, wherein said radiation source comprises a light beam source and said radiation detector comprises a light sensitive detector.

3. The apparatus of claim 1, wherein said radiation source comprises a laser.

4. The apparatus of claim 1, wherein said radiation source and said radiation detector are attached to said mold plate.

5. The apparatus of claim 1, further comprising:
   a plurality of radiation sources; and
   a plurality of radiation detectors positioned directly opposite each radiation source.

6. An injection molding machine comprising:
   a platen;
   a mold attached to said platen, said mold comprising at least one core pin extending perpendicular to a surface of said mold, said core pin having a longitudinal axis;
   a radiation emitting element adjacent said mold and positioned to emit a radiation beam adjacent said at least one core pin and perpendicular to the longitudinal axis of said at least one core pin;
   a radiation receiving element adjacent said mold and positioned directly opposite said radiation emitting element to receive the radiation beam emitted from said radiation emitting element;
   a machine controller connected to said radiation emitting and radiation receiving elements, said controller providing power and control signals to said emitting and receiving elements, said machine controller being configured to receive a sensing signal from said radiation receiving element; and
   a take-out controller connected to said radiation receiving element and configured to receive the sensing signal from said radiation receiving element, said take-out controller being configured to provide a command signal to a take-out plate when it is determined that no molded parts or portions of molded parts remain on said at least one core pin.

7. The injection molding machine of claim 6, wherein said radiation emitting element comprises a laser.

8. The injection molding machine of claim 6, further comprising:
   a plurality of rows of core pins extending perpendicular from said surface of said mold;
   a plurality of radiation emitting elements, wherein each emitting element is positioned to emit a radiation beam proximate a row of core pins; and
   a plurality of radiation detectors positioned directly opposite each of said plurality of radiation emitting elements.

9. An apparatus for detecting the presence of an article on a mold core pin of an injection molding machine comprising:
   a radiation emitting element position adjacent said mold core pin to emit radiation proximate to said mold core pin and perpendicular to a longitudinal axis of said mold core pin;

a radiation receiving element spaced apart from said radiation emitting element and positioned to receive the emitted radiation;

a machine controller connected to said radiation emitting element and to said radiation receiving element, said machine controller being configured to provide power and control signals to said radiation emitting and receiving elements, said machine controller being configured to receive a sensing signal from said radiation receiving element; and a take-out controller connected to said radiation receiving element and configured to receive the sensing signal from said radiation receiving element, said take-out controller being configured to provide a take-out signal to a take-out plate when radiation received by said receiving element indicates that said article has been removed from a predetermined portion of said mold core pin.

10. The apparatus of claim 9, further comprising:
at least one radiation refraction device positioned to refract the radiation beam emitted from said radiation emitting element to said radiation receiving element.

11. The apparatus of claim 9, further comprising:
a plurality of rows of mold core pins extending perpendicular from a surface of a mold; and
a plurality of radiation refraction devices positioned to refract the radiation beam emitted from said radiation emitting element to said radiation receiving element.

12. The apparatus of claim 9, wherein said radiation emitting element comprises a light beam source and said radiation receiving element comprises a light sensitive detector.

13. The apparatus of claim 9, wherein said radiation emitting element comprises a laser.

14. The apparatus of claim 9, wherein said radiation emitting element and said radiation receiving element are attached to a mold plate of an injection molding machine.

15. A method of reducing the injection cycle time of an injection molding machine comprising the steps of:
positioning a radiation transmitting element to transmit radiation adjacent a mold core pin and perpendicular to a longitudinal axis of said mold core pin;
positioning a receiving element at a position spaced apart from said radiation transmitting element;
determining that an article is not present on said mold core pin when the transmitted radiation is received by said radiation receiving element;
transmitting a sensing signal from said radiation receiving element to both a machine controller and a take-out controller in response to the transmitted radiation being received by said radiation receiving element; and
causing a take-out plate to move from a mold area in response to said take-out controller receiving the sensing signal.

16. The method of claim 15, further comprising the step of:
connecting said radiation emitting and receiving elements to the machine controller, said machine controller being configured to provide power and control signals to said radiation emitting and receiving elements.

17. The method of claim 16, further comprising the step of:
inhibiting further operation of said injection molding machine by said machine controller, when the transmitted radiation is not received by said radiation receiving element.

18. The method of claim 15, wherein said radiation emitting element comprises a light beam source and said radiation receiving element comprises a light sensitive detector.

19. The method of claim 15, wherein said radiation emitting element comprises a laser.

20. Apparatus for controlling a vacuum device which removes molded parts from a mold plate of an injection molding machine, comprising:
a controller configured to control said vacuum device so as to apply (i) a higher vacuum pressure to said molded parts to begin their removal from the mold plate, and (ii) a lower vacuum pressure to said molded parts after they begin moving from said mold plate.

21. The apparatus of claim 20, further comprising:
a vacuum pressure relief valve, wherein said controller is configured to cause said pressure relief valve to open to apply the lower vacuum pressure.

22. The apparatus of claim 20, further comprising:
an adjustable flow control device in fluid communication with said pressure relief valve.

23. The apparatus of claim 20, wherein said vacuum device comprises a vacuum pump.

24. An apparatus for removing a molded article from a mold of an injection molding machine comprising:
a plate having at least first and second surfaces;
at least one vacuum passage extending through said plate between the first and second surfaces, each said passage including a port on the first and second surfaces;
at least one hollow receiving member attached to the second surface of said plate, wherein each said hollow member has two openings and one opening surrounds a vacuum passage port;
a vacuum pressure source in fluid communication with each said port on the first surface of said plate; and
a vacuum relief valve in fluid communication with each said port on the first surface of said plate, for varying vacuum pressure applied to the molded part from a first pressure to a second, lower pressure after the molded article begins to be removed from the mold.

25. The apparatus of claim 24, further comprising:
an adjustable flow control device in fluid communication with said vacuum relief valve.

26. The apparatus of claim 24, wherein said vacuum pressure source comprises a vacuum pump.

27. The apparatus of claim 24, wherein said vacuum relief valve comprises an air-operated valve.

28. The apparatus of claim 24, further comprising:
a controller configured to control operation of the vacuum relief valve.

29. The apparatus of claim 28, wherein said controller comprises a pressure switch.

30. An apparatus for removing an article from the mold of an injection molding machine comprising:
a plate;
a hollow tube attached to a first surface of said plate, said hollow tube having a hollow central portion for receiving said article from said mold;
means for generating a vacuum pressure within said hollow tube, wherein the vacuum pressure develops a force urging said article from said mold toward said hollow central portion;
vacuum pressure sensing means for sensing a magnitude of the vacuum pressure within said hollow tube and generating a control signal if the vacuum pressure reaches a first predetermined magnitude; and relief valve means for receiving the control signal from said sensing means and reducing the magnitude of the vacuum pressure to a second, lower magnitude after the article begins to be removed from the mold.

31. The apparatus of claim 30, further comprising:

flow control means in fluid communication with said relief valve means.

32. The apparatus of claim 30, wherein said vacuum pressure generating means comprises a vacuum pump.

33. The apparatus of claim 30, wherein said vacuum pressure sensing means comprises a pressure switch.

34. A method of removing a molded article from a mold of an injection molding machine comprising:

connecting a vacuum pressure source to a receiving means for receiving said molded article, wherein said vacuum pressure source generates a vacuum pressure magnitude within said receiving means;

moving said receiving means adjacent said molded article, such that the vacuum pressure within said receiving means draws said molded article into said receiving means;

sensing the vacuum pressure magnitude within said receiving means; and reducing the vacuum pressure magnitude within said receiving means from a first magnitude to a second, lower magnitude after the molded article begins to be removed from the mold.

35. The method of claim 34, wherein said second magnitude is sufficient to just maintain said molded articles in said receiving means against gravitational force.

36. An injection molding machine comprising:

a platen;

a mold attached to said platen, said mold comprising at least one core pin;

clamping means for applying a clamping load to said mold;

injection means for injecting molten material into said mold;

radiation emitting means positioned adjacent said mold for emitting radiation adjacent said at least one core pin;

radiation receiving means positioned adjacent said mold for receiving the radiation emitted from said radiation emitting means;

machine controller means for controlling operation of said clamping means and said injection means, said machine controller means further providing power and control signals to said radiation emitting and receiving means, said machine controller means receiving a sensing signal from said radiation receiving means;

a movable take-out plate;

a take-out controller means for controlling said movable take-out plate, said takeout controller receiving the sensing signal from said radiation receiving means and providing a take-out signal to move said take-out plate out of a mold area when the emitted radiation is received by said receiving means;

a hollow tube attached to a first surface of said take-out plate, said hollow tube having a hollow central portion for receiving an article from said mold;

means for moving said take-out plate such that the first surface of said take-out plate is adjacent the surface of said mold;

means for generating a vacuum pressure within said hollow tube, wherein said vacuum pressure develops a force urging said article from said mold toward said hollow central portion;

vacuum pressure sensing means for sensing a magnitude of the vacuum pressure within said hollow tube and generating a control signal if the vacuum pressure reaches a first predetermined magnitude; and relief valve means for receiving the control signal from said sensing means and reducing the magnitude of the vacuum pressure to a second, lower magnitude after the article begins to be removed from the mold.

37. The injection molding machine of claim 36, wherein said radiation emitting means comprises a light beam source and said radiation detecting means comprises a light sensitive detector.

38. The injection molding machine of claim 36, wherein said radiation emitting means comprises a laser.

39. The injection molding machine of claim 36, further comprising:

a plurality of rows of core pins extending perpendicular from a surface of said mold;

a plurality of said radiation emitting means, wherein each emitting means is positioned to emit a radiation beam proximate a row of core pins; and a plurality of said radiation receiving means positioned directly opposite each of said plurality of radiation emitting means.

40. The injection molding machine of claim 36, further comprising:

at least one radiation refraction means positioned to refract the radiation beam emitted from said radiation emitting means to said radiation receiving means.

41. The injection molding machine of claim 36, further comprising:

a plurality of rows of core pins extending perpendicular from said surface of said mold; and a plurality of radiation refraction means positioned to refract the radiation beam emitted from said radiation emitting means to said radiation receiving means.

42. The injection molding machine of claim 36, further comprising:

an adjustable flow control means in fluid communication with said relief valve means.

43. The injection molding machine of claim 36, wherein said vacuum pressure generating means comprises a vacuum pump.

44. The injection molding machine of claim 36, wherein said vacuum pressure sensing means comprises a pressure switch.

* * * * *